US010040393B2

(12) United States Patent
Hasegawa et al.

(10) Patent No.: US 10,040,393 B2
(45) Date of Patent: Aug. 7, 2018

(54) ILLUMINATION SYSTEM, MOBILE BODY, AND LIGHTING CONTROL METHOD

(71) Applicant: Panasonic Intellectual Property Management Co., Ltd., Osaka (JP)

(72) Inventors: Junichi Hasegawa, Osaka (JP); Makoto Yamada, Osaka (JP); Yoko Matsubayashi, Osaka (JP); Ayako Tsukitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/657,956

(22) Filed: Jul. 24, 2017

(65) Prior Publication Data

US 2018/0029532 A1    Feb. 1, 2018

(30) Foreign Application Priority Data

Jul. 28, 2016  (JP) .................................. 2016-148991

(51) Int. Cl.
*B64D 11/00* (2006.01)
*B60Q 3/54* (2017.01)
(Continued)

(52) U.S. Cl.
CPC ................. *B60Q 3/47* (2017.02); *B60Q 3/44* (2017.02); *B64D 11/00* (2013.01); *F21S 8/033* (2013.01);
(Continued)

(58) Field of Classification Search
None
See application file for complete search history.

(56) References Cited

U.S. PATENT DOCUMENTS

| 5,770,917 A | 6/1998 | Yano et al. |
| 7,178,871 B1 | 2/2007 | Round et al. |

(Continued)

FOREIGN PATENT DOCUMENTS

| JP | 3040719 B2 | 5/2000 |
| JP | 2002-527288 A | 8/2002 |

(Continued)

OTHER PUBLICATIONS

DiLaura, David L., et al., "Illuminating Engineering Society The Lighting Handbook," 10th edition Reference and Application, 2 pgs.

(Continued)

*Primary Examiner* — Dedei K Hammond
(74) *Attorney, Agent, or Firm* — McDermott Will & Emery LLP (57) ABSTRACT

An illumination system includes: a seat in a mobile body; a table to be positioned in front of a passenger when the passenger is seated on the seat; a first light source which illuminates the table; and a second light source which illuminates a region closer to the passenger than to the table. When a distance from the first light source to the table is equal to a distance from the second light source to a virtual irradiated surface, an illuminance on the table irradiated by the first light source is lower than an illuminance on the virtual irradiated surface irradiated by the second light source.

18 Claims, 7 Drawing Sheets

(51) Int. Cl.
  *B60Q 3/47* (2017.01)
  *B60Q 3/44* (2017.01)
  *F21S 8/00* (2006.01)
(52) U.S. Cl.
  CPC .. *B64D 2011/0053* (2013.01); *B64D 2203/00* (2013.01)

(56) References Cited

U.S. PATENT DOCUMENTS

2010/0065683 A1   3/2010  Darbyshire
2012/0008318 A1   1/2012  Ishiwata et al.
2013/0027954 A1*  1/2013  Boomgarden ......... B64D 11/00
                                                    362/510

FOREIGN PATENT DOCUMENTS

| JP | 2008-200486 A | 9/2008 |
| JP | 2009-538251 A | 11/2009 |
| JP | 2010-075312 A | 4/2010 |
| JP | 2010-076530 A | 4/2010 |
| JP | 2010-099410 A | 5/2010 |
| JP | 2011-204659 A | 10/2011 |
| JP | 2015-221655 A | 12/2015 |

OTHER PUBLICATIONS

Hashimoto K., et al., "New Method for Specifying Color-Rendering Properties of Light Sources Based on Feeling of Contrast," Color research and application, vol. 32, No. 5, Oct. 2007, pp. 361-371.

* cited by examiner

ILLUMINATION SYSTEM, MOBILE BODY, AND LIGHTING CONTROL METHOD

CROSS REFERENCE TO RELATED APPLICATION

This application claims the benefit of priority of Japanese Patent Application Number 2016-148991 filed on Jul. 28, 2016, the entire content of which is hereby incorporated by reference.

BACKGROUND

1. Technical Field

The present disclosure relates to an illumination system including, for example, a dining light and a reading light, a mobile body including the illumination system, and a lighting control method.

2. Description of the Related Art

A known seating unit includes: a main seat disposed in an airplane; and a reading light (see Patent Literature (PTL) 1 (Japanese Unexamined Patent Application Publication No. 2002-527288), for example).

This seating unit can be caused to turn on the reading light to assist a user in reading.

SUMMARY

A conventional illumination system can be caused to turn on a reading light to assist a user not only in reading but also in dining in a mobile body. The conventional reading light, however, is suitable for reading but not for dining, and thus does not provide comfort and pleasantness in the mobile body. Meanwhile, in recent years, there has been a demand for providing passengers with a more comfortable light environment for reading and dining in a mobile body.

In view of this, it is an object of the present disclosure to provide an illumination system, a mobile body, and a lighting control method which provide an optimum light environment when a passenger reads or dines.

An illumination system according to one aspect of the present disclosure includes a seat in a mobile body, a table to be positioned in front of a passenger when the passenger is seated on the seat, a first light source which illuminates the table, and a second light source which illuminates a region closer to the passenger than to the table illuminated by the first light source. When a distance from the first light source to the table is equal to a distance from the second light source to a virtual irradiated surface, an illuminance on the table irradiated by the first light source is lower than an illuminance on the virtual irradiated surface irradiated by the second light source.

Moreover, a mobile body according to one aspect of the present disclosure includes the illumination system.

Furthermore, a lighting control method according to one aspect of the present disclosure includes: acquiring information with respect to food placed on a table; transmitting the information with respect to the food from the detector to a controller; and controlling an illumination mode of a light source that illuminates the food, based on the information.

The present disclosure provides an illumination system, a mobile body, and a lighting control method which provide an optimum light environment when a passenger reads or dines.

BRIEF DESCRIPTION OF DRAWINGS

The figures depict one or more implementations in accordance with the present teaching, by way of examples only, not by way of limitations. In the figures, like reference numerals refer to the same or similar elements.

(A) of FIG. 2 is a top view illustrating the illumination system according to Embodiment 1, and (B) of FIG. 2 is a conceptual diagram illustrating a seated posture of a passenger in the illumination system according to Embodiment 1.

(A) of FIG. 3 is a conceptual diagram illustrating dining by the passenger in the illumination system according to Embodiment 1, and (B) of FIG. 3 is a conceptual diagram illustrating reading by the passenger in the illumination system according to Embodiment 1.

DETAILED DESCRIPTION OF THE EMBODIMENTS

Hereinafter, embodiments of the present disclosure will be described with reference to the drawings. It is to be noted that the embodiments described below each show a generic or specific example of the present disclosure. The numerical values, shapes, materials, structural elements, the arrangement and connection of the structural elements, steps, the processing order of the steps, etc. shown in the following embodiments are mere examples, and thus are not intended to limit the present disclosure. As such, among the structural elements in the following embodiments, structural elements not recited in any of the independent claims defining the most generic concept of the present disclosure are described as optional elements.

It is also to be noted that regarding the expression "substantially XX," for example, "substantially the same" is intended to include not only exactly the same but also something that can be substantially recognized as the same. The same holds true for the expression "in the vicinity of XX."

It is also to be noted that the figures are schematic diagrams and are not necessarily precise illustrations. Additionally, the same structural elements are given the same reference signs in the figures, and thus duplicate explanation thereof is omitted or abridged.

Embodiment 1

[Configuration]

First, the configuration of illumination system 1 according to Embodiment 1 will be described with reference to FIG. 1 to FIG. 5.

Figure 1:
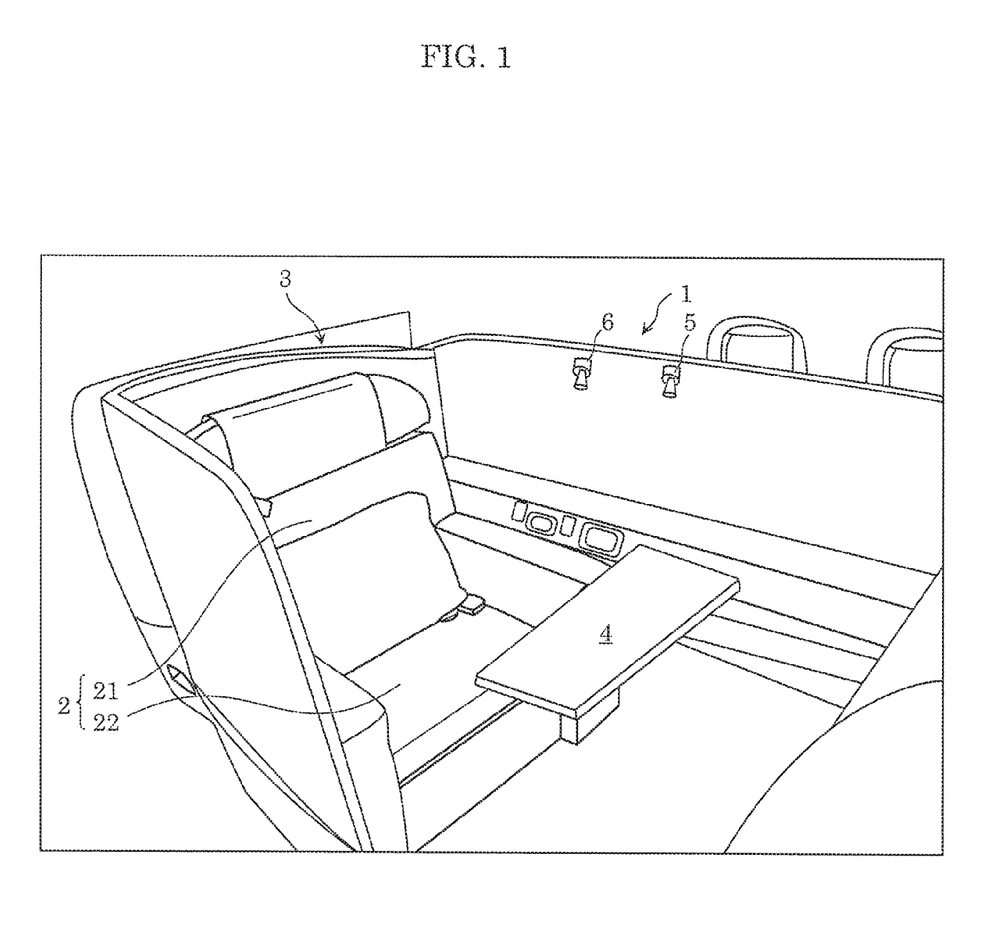
FIG. 1 is a schematic view illustrating an example of use of an illumination system according to Embodiment 1.
Figure 2:
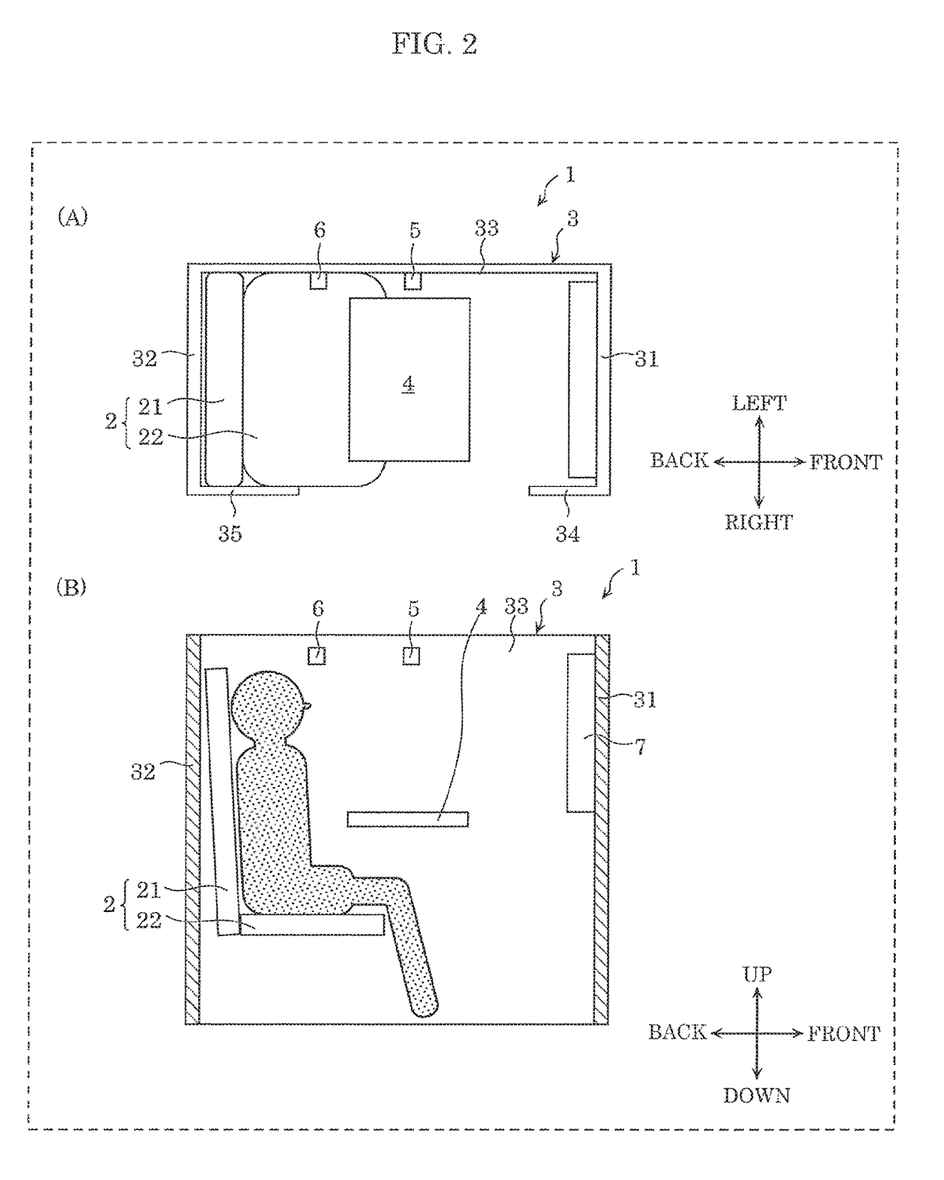
Figure 3:
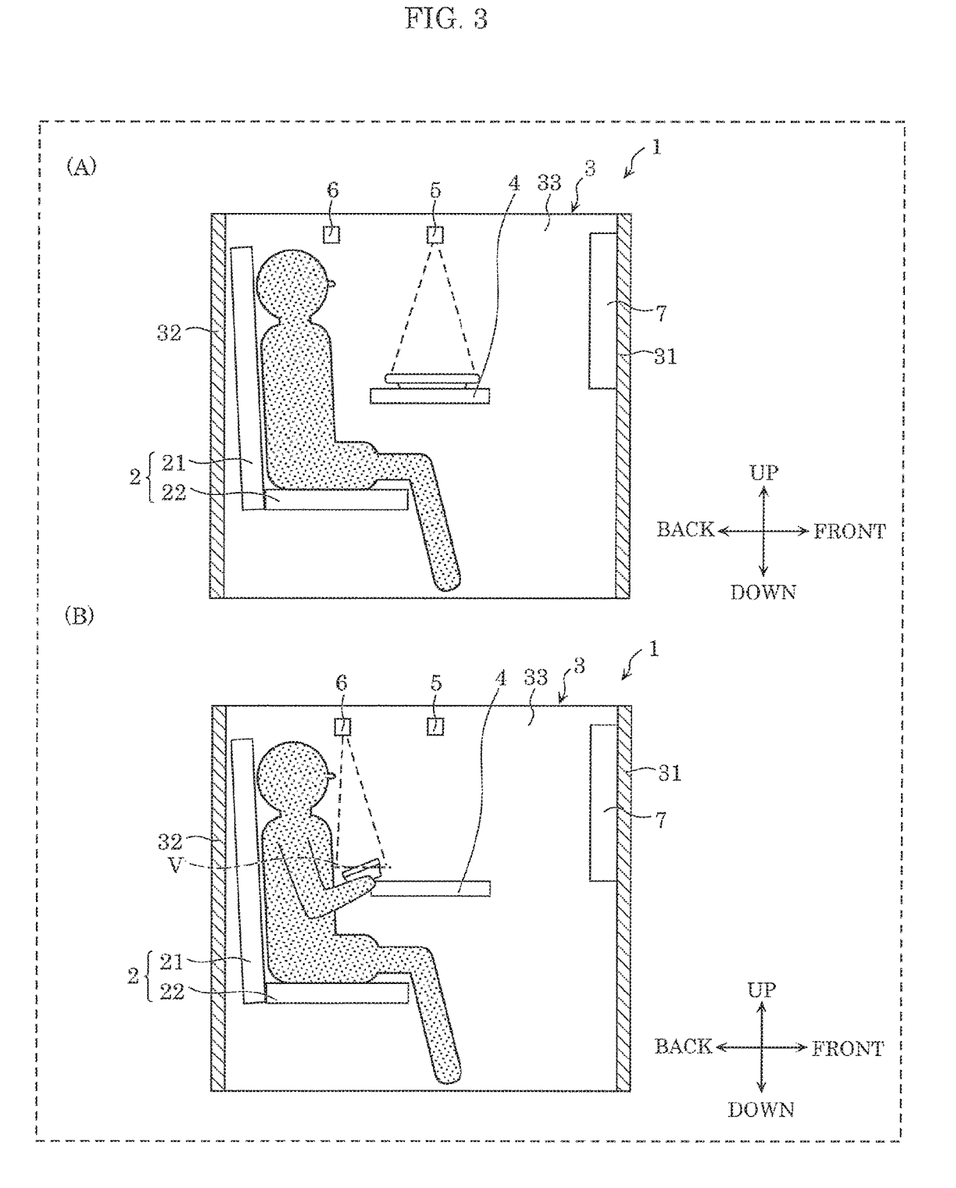
Figure 4:
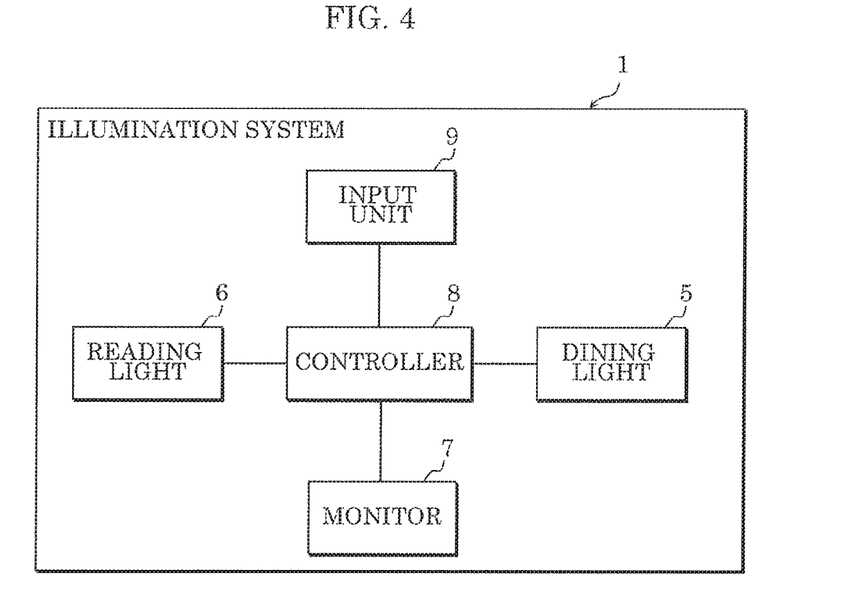
FIG. 4 is a block diagram illustrating the illumination system according to Embodiment 1.
Figure 5:
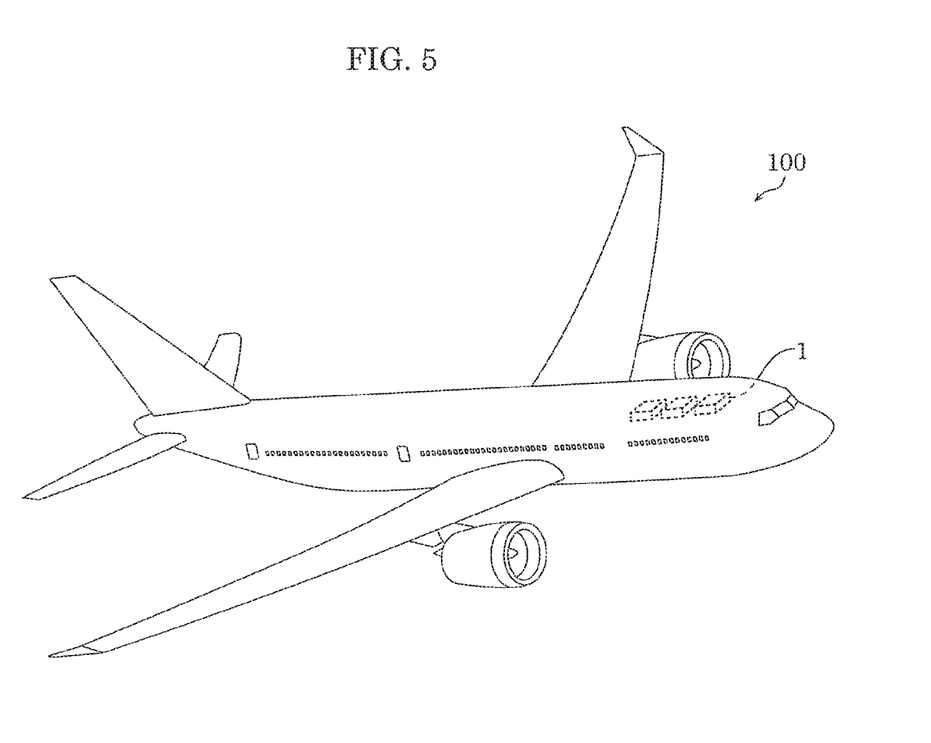
FIG. 5 is an external view illustrating an airplane including the illumination system according to Embodiment 1.

FIG. 1 is a schematic view illustrating an example of use of illumination system 1 according to Embodiment 1. (A) of FIG. 2 is a top view illustrating illumination system 1 according to Embodiment 1. (B) of FIG. 2 is a conceptual diagram illustrating a seated posture of a passenger in illumination system 1 according to Embodiment 1. (A) of FIG. 3 is a conceptual diagram illustrating dining by the passenger in illumination system 1 according to Embodiment 1. (B) of FIG. 3 is a conceptual diagram illustrating reading by the passenger in illumination system 1 according to Embodiment 1. FIG. 4 is a block diagram illustrating illumination system 1 according to Embodiment 1. FIG. 5 is an external view illustrating an airplane including illumination system 1 according to Embodiment 1.

In FIG. 2, the directions of front, back, left, right, up, and down are shown, where directions from illumination system 1 toward the front side of the passenger, a side opposite the front side, the overhead side of the passenger, a side opposite the overhead side, the left side of the passenger, and a side opposite the left side are defined as front, back, up, down, left, and right, respectively. It is to be noted that directions illustrated in FIG. 3 respectively correspond to the directions illustrated in FIG. 2. It is also to be noted that the directions of up and down, the directions of left and right, and the directions of front and back illustrated in FIG. 2 may change depending on how illumination system 1 is used, and are non-limiting examples accordingly. The same holds true for all the subsequent figures.

Illumination system 1 according to Embodiment 1 is included in mobile body 100, for example an airplane, as illustrated in FIG. 5, and is used for, for example, a seat of the airplane. It is to be noted that illumination system 1 according to Embodiment 1 may be used for a seat of mobile body 100 other than the airplane, and need not be for exclusive use in mobile body 100. Mobile body 100 may be, for example, a vehicle such as a train, or a ship.

As illustrated in FIG. 1, (A) and (B) of FIG. 2, and FIG. 4, illumination system 1 includes seat 2, wall 3, table 4 (an example of a table), dining light 5 (an example of a first light source), reading light 6 (an example of a second light source), monitor 7, controller 8, and input unit 9.

Seat 2 is a place for a passenger to sit on, and includes backrest 21 and seating portion 22.

Backrest 21 is substantially perpendicular to seating portion 22 and mainly supports the back of the passenger when the passenger is in a seated posture. Seating portion 22 is mainly in contact with the buttocks of the passenger when the passenger is in the seated posture, supports the seated posture, and is provided substantially horizontally. Backrest 21 is pivotable about an end portion of seating portion 22 by sliding backrest 21 and seating portion 22 such that the passenger takes a lying posture. When the passenger takes the lying posture, backrest 21 pivots on seating portion 22, and backrest 21 and seating portion 22 becomes substantially horizontal.

Wall 3 is a partition and is disposed in the vicinity of seat 2 to surround seat 2 at least partly. Moreover, wall 3 may support backrest 21 and seating portion 22 in a slidable manner. It is to be noted that backrest 21 and seating portion 22 are not necessarily supported by wall 3, and, for example, a dedicated supporting member may support at least one of backrest 21 and seating portion 22.

In Embodiment 1, wall 3 includes front side wall 31, back side wall 32, left side wall (an example of a side wall), right front side wall 34, and right back side wall 35, and surrounds seat 2 except for an opening between right front side wall 34 and right back side wall 35. Front side wall 31 is located more forward than seat 2 and faces the passenger when the passenger is seated on seat 2. Back side wall 32 is located more backward than seat 2 and is on the back of the passenger when the passenger is seated on seat 2. Left side wall 33 is on the left side of the passenger when the passenger is seated on seat 2, and extends from front side wall 31 to back side wall 32. Right front side wall 34 extends from front side wall 31 toward back side wall 32 so as to form the opening between right front side wall 34 and right back side wall 35. Right back side wall 35 extends from back side wall 32 toward front side wall 31. It is to be noted that one of right front side wall 34 and right back side wall 35 may be the example of the side wall.

Table 4 is used when the passenger dines or reads, and in Embodiment 1, table 4 is placed forward (an example of front) of seat 2 when the passenger is seated on seat 2. Table 4 may be, for example, movable such that table 4 can be moved forward of the passenger when the passenger is seated on seat 2, or fixed to wall 3 etc., and a configuration of table 4 is not particularly limited.

As illustrated in (B) of FIG. 3, reading light 6 emits light to illuminate a region closer to the passenger than to table 4, and is specifically used when the passenger reads. In other words, reading light 6 illuminates a place in the vicinity of the passenger when the passenger reads. It is desirable that the location of reading light 6 be on the left of the passenger when the passenger is in the seated posture. In Embodiment 1, reading light 6 is provided on left side wall 33 and between dining light 5 and backrest 21. Reading light 6 is provided such that the optical axis of reading light 6 crosses seating portion 22 when the passenger is in the seated posture, and crosses one of backrest 21 and seating portion 22 when the passenger is in the lying posture. It is to be noted that reading light 6 may be provided such that the optical axis of reading light 6 crosses the top surface of table 4. Moreover, the location of reading light 6 is not limited to wall 3, and may be provided to, for example, seat 2, a dedicated supporting member etc., or the ceiling of mobile body 100. Furthermore, although a type of a light source used for reading light 6 is not particularly limited, an LED, a fluorescent light, a laser light, or an organic EL element may be used, for example.

A color temperature of the light emitted by reading light 6 is set to be at least 5000 K and at most 7200 K to make letters of books, newspapers, etc. more readable or pictures more viewable (to provide a satisfactory visual environment) when the passenger reads such medium. In other words, reading light 6 emits the light having the color temperature different from a color temperature of light emitted by dining light 5.

Figure 6:
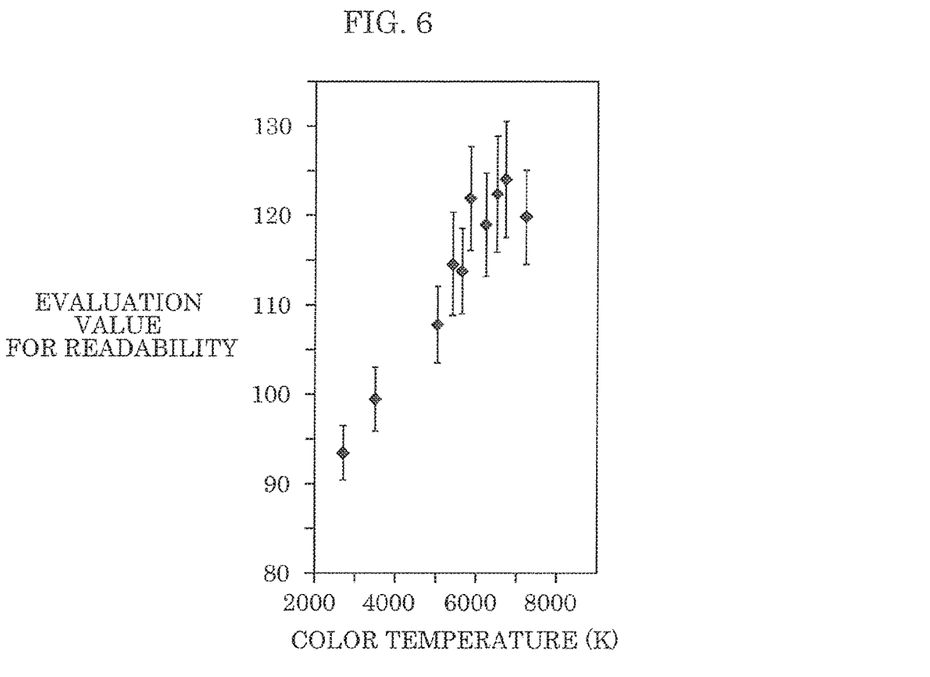
FIG. 6 is a graph illustrating a color temperature and an evaluation value for readability in the illumination system according to Embodiment 1.

FIG. 6 is a graph illustrating a color temperature and an evaluation value for readability in illumination system 1 according to Embodiment 1, and shows results of subjective evaluations using magnitude estimation (a relative evaluation method) in which letters under reference light and letters under test light are compared. In the magnitude estimation, a readability under reference light is 100, when the letters etc. under test light are more readable than the letters etc. under reference light, a readability under test light is evaluated using a number greater than 100, and when the letters etc. under test light are less readable than the letters under reference light, a readability under test light is evaluated using a number less than 100. In other words, an evaluation value for readability is an index indicating a readability of letters, a viewability of pictures, etc., and a light source having an evaluation value for readability greater than 100 makes letters, pictures, etc. more clearly visible, bringing a sense of visibility.

The subjective evaluations are conducted to calculate evaluation values for readability in seven categories (very readable, readable, slightly readable, normal, slightly unreadable, unreadable, and very unreadable). When the occurrence ratio of an evaluation in which slightly readable is felt is at least 50%, an evaluation value for readability is 110 in the magnitude estimation. In addition, when the occurrence ratio of an evaluation in which very readable is felt is at least 50%, an evaluation value for readability is 120 in the magnitude estimation. From these results, it is clear that the evaluation value for readability increases as the color temperature of the light rises.

As illustrated in (B) of FIG. 3, reading light 6 may be turned on when the passenger reads. Specifically, the passenger may turn on reading light 6 with any timing via the input unit.

As illustrated in (A) of FIG. 3, dining light 5 emits light to illuminate table 4, and specifically illuminates the top surface of table 4 and is used especially when the passenger dines. It is desirable that the location of dining light 5 be on the left of the passenger when the passenger is seated on seat 2. Dining light 5 is provided such that the optical axis of dining light 5 crosses the top surface of table 4. In Embodiment 1, dining light 5 is provided on left side wall 33 and above table 4. Moreover, the location of dining light 5 is not limited to wall 3, and may be provided to, for example, seat 2, a dedicated supporting member etc., or the ceiling of mobile body 100. Furthermore, although a type of a light source used for dining light 5 is not particularly limited, an LED, a fluorescent light, a laser light, or an organic EL element may be used, for example. As an example in which the LED is used for dining light 5 and reading light 6, dining light 5 and reading light 6 may each include LED chips having mutually different light colors, or may each include LED chips of RGB or LED chips of RGB and white.

Figure 7:
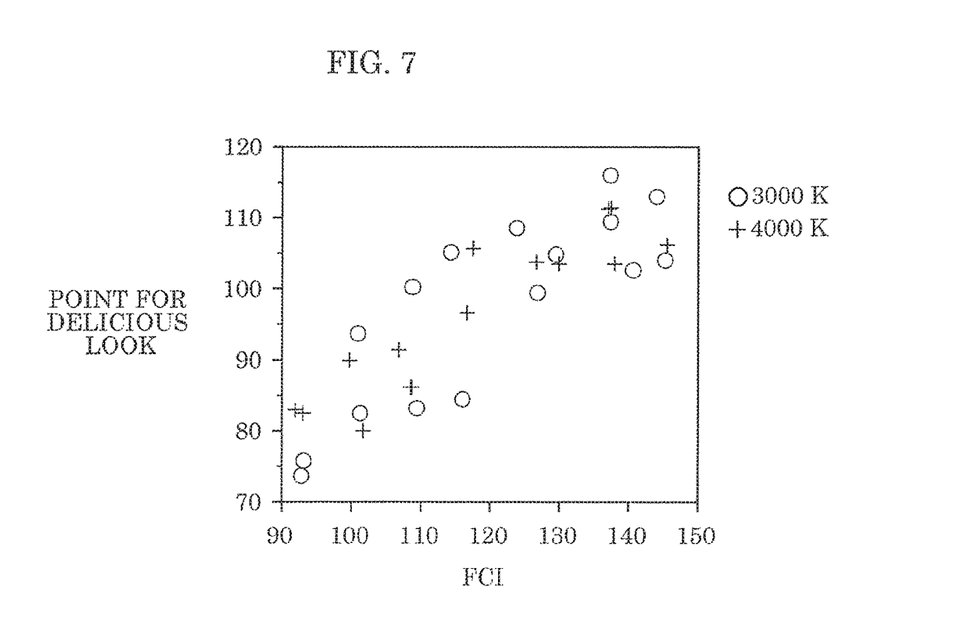
FIG. 7 is a graph illustrating a point for delicious look and a Feeling of Contrast Index (FCI) in the illumination system according to Embodiment 1.

FIG. 7 is a graph illustrating a point for delicious look and an FCI in illumination system 1 according to Embodiment 1.

In FIG. 7, the symbol ○ indicates a correlated color temperature of 3000 K, the symbol + indicates a correlated color temperature of 4000 K, and a relationship is shown between the FCI of dining light 5 and a point (desirability) for delicious look that enhances as the FIC increases. A color temperature of the light emitted by dining light 5 is set to be at least 2700 K and less than 5000 K when the passenger dines. This is based on an index indicating a degree of conspicuousness and vividness in color rendering by a light source, which is referred to as the FCI.

Reference light source D65 has an FCI of 100 as a reference, and a light source having an FCI greater than 100 enhances color more than reference light source D65 and causes people to feel that a space illuminated is bright. (See Illuminating Engineering Society THE LIGHTING HANDBOOK 10$^{th}$ edition Reference and Application 6.24, 6.34 etc, and Hashimoto K, Yano T, Shimizu M, and Nayatani Y. New Method for Specifying Color-Rendering Properties of Light Sources Based on Feeling of Contrast. Color research and application Vol. 32, No. 5, October 2007: 361-371.) Specifically, an FCI is calculated by Equation 1 below.

[Math. 1]

$$FCI = \left(\frac{G_{LAB}(T)}{G_{LAB}(D65)}\right)^{1.5} \times 100 \qquad \text{(Equation 1)}$$

$G_{LAB}(T)$ represents a color gamut area in the Lab color space of a four color combination sample of red, blue, green, and yellow under test light. $G_{LAB}(D65)$ represents a color gamut area in the Lab color space of the same four color combination sample under reference light source D65.

From FIG. 7, it is clear that, for any correlated color temperature, the point for delicious look increases as the FCI increases. In other words, increasing the FCI allows a representation (illumination) for making food look delicious (makes it possible to provide a satisfactory visual environment). Points for delicious look result from the subjective evaluations using the magnitude estimation (the relative estimation method). In the magnitude estimation, a delicious look under reference light is 100 (a reference value), when food etc. under test light looks more delicious than food etc. under reference light, a delicious look is evaluated using a number greater than 100, and when food etc. under test light does not look more delicious than food etc. under reference light, a delicious look is evaluated using a number less than 100. The result is obtained that the delicious look is achieved when the FCI is approximately 120, whether the color temperature is 3000 K or 4000 K. From these results, the FCI of dining light 5 is set higher than the FCI of reading light 6 to achieve the conspicuousness and vividness in the color rendering by the light source.

Dining light 5 may be turned on when the passenger dines. Specifically, the passenger may turn on dining light 5 with any timing via the input unit, or a cabin attendant on board mobile body 100 may turn on dining light 5 with proper timing via the input unit. In addition, a detector included in illumination system 1 may recognize food placed on table 4 and turn on dining light 5. Embodiment 1 is not limited to these means, and dining light 5 may be turned on using a publicly known means.

The following describes a relationship between an illuminance of dining light 5 and an illuminance of reading light 6 on table 4.

The illuminance of dining light 5 is generally recommended to be, for example, in a range of from 100 lx to 800 lx on average for an irradiated surface of table 4 away from dining light 5 by a distance in a range of from approximately 300 mm to approximately 1200 mm, the irradiated surface having a size of substantially A3. In contrast, when a distance from reading light 6 is the same as dining light 5, the illuminance of reading light 6 is recommended to be in a range of from 150 lx to 1000 lx on average. (See JIS Z 9110 General rules of recommended lighting levels.) By setting irradiation intensity of the light of dining light 5 to be lower than irradiation intensity of the light of reading light 6, a representation for making food look delicious is produced at a time of dining, and a representation for readability is produced at a time of reading.

When the distance from dining light 5 to table 4 is equal to a distance from reading light 6 to virtual irradiated surface V, an illuminance on table 4 irradiated by dining light 5 is lower than an illuminance on virtual irradiated surface V irradiated by reading light 6. In Embodiment 1, reading light 6 is provided to illuminate the place in the vicinity of the passenger. Virtual irradiated surface V is irradiated with light emitted by reading light 6, and is assumed to be a horizontal surface. Virtual irradiated surface V may be an object such as a book, a newspaper, and a smartphone.

The following describes uniformity ratios of illuminance of dining light 5 and reading light 6.

A uniformity ratio of illuminance is a ratio of the minimum illuminance on an irradiated surface to an average illuminance, and is an index indicating a brightness variation (uniformity). It is to be noted that the uniformity ratio of illuminance can be indicated in an illuminance gradient between the center of an irradiated surface (a point where the irradiated surface and an optical axis cross each other) and a place within a certain distance from the center.

Figure 8:
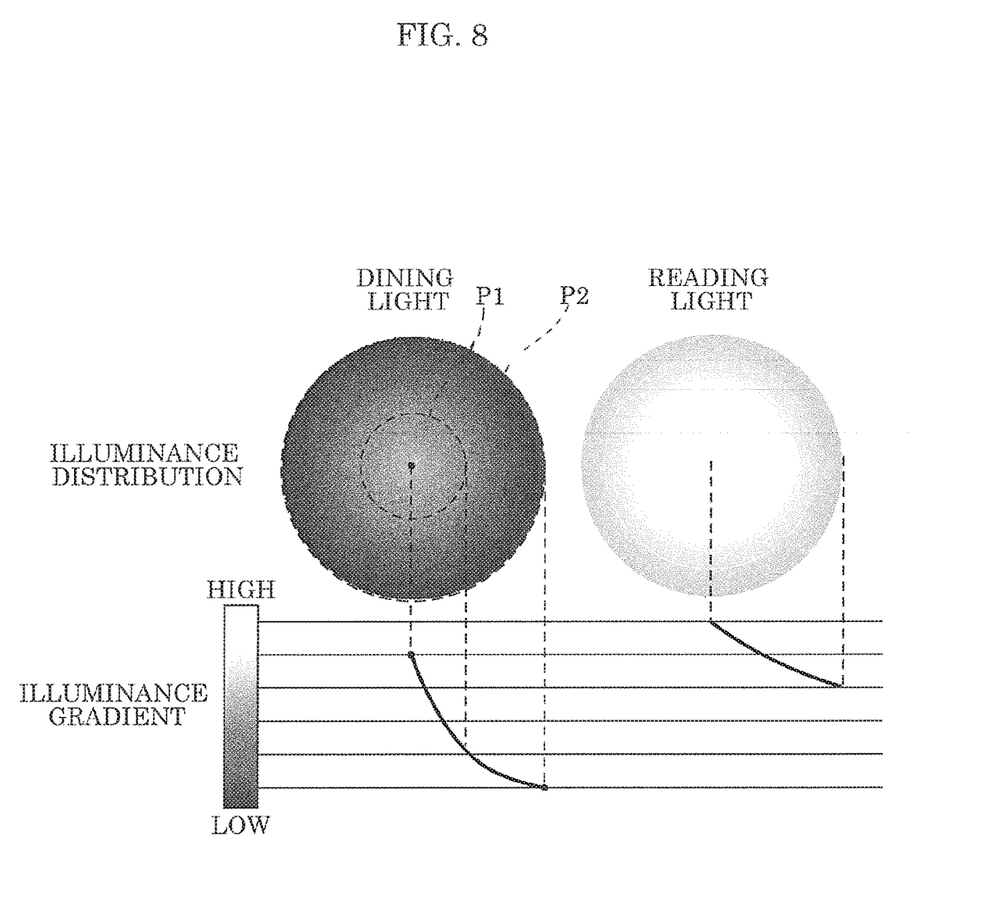
FIG. 8 is a conceptual diagram illustrating illuminance distributions and illuminance gradients of a dining light and a reading light in the illumination system according to Embodiment 1.

FIG. 8 is a conceptual diagram illustrating illuminance distributions and illuminance gradients of dining light 5 and reading light 6 in illumination system 1 according to Embodiment 1. FIG. 8 shows the illuminance distribution when dining light 5 emits light to table 4, and the illuminance distribution when reading light 6 emits light to virtual irradiated surface V. The illuminance distribution of dining light 5 includes central irradiated area P1 having the optical axis of dining light 5 as the center, and peripheral irradiated area P2 which is the periphery of central irradiated area P1 and has a lower illuminance than central irradiated area P1. The illuminance gradually decreases with distance from the optical axis in central irradiated area P1 and peripheral irradiated area P2 of dining light 5.

Regarding dining light 5, an illuminance gradient of central irradiated area P1 from the center of the irradiated surface (the maximum illuminance) to the outermost edge of central irradiated area P1 (the minimum illuminance) is steeper than an illuminance gradient of peripheral irradiated area P2 from the vicinity of an inner periphery of peripheral irradiated area P2 (the maximum illuminance) to the outermost edge of peripheral irradiated area P2 (the minimum illuminance). (Light and shade per unit distance is intense.) In other words, a degree to which an illuminance decreases with distance from the optical axis of dining light 5 is greater in central irradiated area P1 than in peripheral irradiated area P2. The vicinity of the inner periphery of peripheral irradiated area P2 is an area which is in peripheral irradiated area P2 and in the vicinity of a boundary between central irradiated area P1 and peripheral irradiated area P2.

Central irradiated area P1 has a low uniformity ratio of illuminance, because an illuminance difference between the center of the irradiated surface and the outermost edge of the same is large (the illuminance gradient is steep). Moreover, peripheral irradiated area P2 has a higher uniformity ratio of illuminance than central irradiated area P1, because an illuminance difference between the inner peripheral edge of the irradiated surface and the outermost edge of the same is smaller than that of central irradiated area P1. It is to be noted that a uniformity ratio of illuminance of reading light 6 on the irradiated surface (central irradiated area P1 and peripheral irradiated area P2) is higher than that of dining light 5 to be described later. The low uniformity ratio of illuminance results in a greater luminance difference between the center of the irradiated surface and the outermost edge of peripheral irradiated area P2, and food etc. is made easily look more vivid than a case where reading light 6 is used to emit light to the food etc.

Regarding dining light 5, a color temperature of the light in central irradiated area P1 is higher than a color temperature of the light in peripheral irradiated area P2. For example, an average color temperature in central irradiated area P1 may be higher by at least 150 K than an average color temperature in peripheral irradiated area P2.

In contrast, an illuminance gradient of reading light 6 from the center of the irradiated surface (the maximum illuminance) to the outermost edge of the same (the minimum illuminance) is gentler than the illuminance gradient of dining light 5. In other words, reading light 6 has a small illuminance difference between the center of the irradiated surface and the outermost edge of the same (a gentle illuminance gradient), and a high uniformity ratio of illuminance. The high uniformity ratio of illuminance results in a small luminance difference between the center of the irradiated surface and the outermost edge of the same, and letters are easily read. For example, it is desirable that a uniformity ratio of illuminance of reading light 6 when reading light 6 emits light to a book be at least approximately 0.7. (See JIS Z 9110 General rules of recommended lighting levels.) It is also desirable that an area for which the uniformity ratio of illuminance is kept at at least approximately 0.7 be within approximately 250 mm to approximately 450 mm from the center of the irradiated surface.

As illustrated in FIG. 4, controller 8 is electrically connected to dining light 5, reading light 6, input unit 9, etc., and is capable of controlling these structural elements. Controller 8 controls lighting of dining light 5 and reading light 6 via input unit 9. Controller 8 causes dining light 5 to emit light having a color temperature suitable for food placed on table 4.

Input unit 9 is an operation terminal for operating dining light 5, reading light 6, monitor 7, etc. Input unit 9 is provided with, for example, options (lighting modes) suitable for foods (meal menus) or scenes such as a lighting mode for Japanese food, a lighting mode for Chinese food, a lighting mode for breakfast, and a lighting mode for dinner.

When the passenger controls lighting according to a food, the passenger uses input unit 9 to select, for example, the lighting mode for Japanese food such that the lighting suitable for the corresponding food is performed. As a result, controller 8 enters the lighting mode for Japanese food, and dining light 5 of the passenger emits light having a color temperature of at least 4000 K and less than 5000 K which is suitable for Japanese food. For example, the control is performed for Japanese food such that light having a high color temperature to heighten contrast between a color of a serving dish and a color of food. Moreover, for example, dining light 5 is caused to emit light having a color temperature of at least 2700 K and less than 4000 K for Chinese food and western food such as Italian food including a meat dish, bread, wine, etc. The light having the color temperature suitable for food is emitted as described above. It is to be noted that input unit 9 may be provided outside of illumination system 1 such that the cabin attendant in mobile body 100 can operate input unit 9.

Monitor 7 displays a video, and is provided on front side wall 31 in Embodiment 1. It is to be noted that monitor 7 may be provided to a dedicated supporting member.

As stated above, in illumination system 1 according to Embodiment 1, when the passenger dines, dining light 5 emits light to the food placed on table 4. Moreover, when the passenger reads, reading light 6 emits light to the book etc. With this, illumination system 1 provides the light environment suitable for dining, reading, or the like.

Advantageous Effects

Next, advantageous effects of illumination system 1 and mobile body 100 according to Embodiment 1 will be described.

As described above, illumination system 1 according to Embodiment 1 includes: seat 2 in mobile body 100; table 4 to be positioned in front of a passenger when the passenger is seated on seat 2; dining light 5 which illuminates table 4;

and reading light 6 which illuminates a region closer to the passenger than to table 4 illuminated by dining light 5. When a distance from dining light 5 to table 4 is equal to a distance from reading light 6 to virtual irradiated surface V, an illuminance on table 4 irradiated by dining light 5 is lower than an illuminance on virtual irradiated surface V irradiated by reading light 6.

According to this configuration, dining light 5 and reading light 6 each illuminate a different place. When a passenger dines, dining light 5 emits light to food on table 4 to make the food look delicious. Moreover, when the passenger reads, reading light 6 emits light to a book or the like to make letters etc. easily viewable at uniform brightness, which improves readability. For this reason, it is possible to provide a satisfactory visual environment suitable for dining, reading, or the like, and to achieve comfort.

Accordingly, illumination system 1 is capable of providing an optimum light environment when passengers read or dine.

Moreover, mobile body 100 according to Embodiment 1 includes illumination system 1. In addition, mobile body 100 according to Embodiment 1 is an airplane.

This configuration also produces the same advantageous effects as illumination system 1 according to Embodiment 1.

Moreover, in illumination system 1 according to Embodiment 1, dining light 5 is turned on when the passenger dines. Reading light 6 is turned on when the passenger reads.

This configuration also makes it possible to provide the satisfactory visual environment suitable for dining, reading, or the like, and to achieve comfort.

Moreover, in illumination system 1 according to Embodiment 1, reading light 6 is provided in a region closer to seat 2 than dining light 5 is.

According to this configuration, considered is a relationship of positions at which light is emitted when the passenger reads and when the passenger dines. If dining light 5 is used as reading light 6, the installation position of dining light 5 is far from the face of the passenger, an emission distance is large, and dining light 5 is not effective. In contrast, in Embodiment 1, reading light 6 is configured to turn toward a reading material such as a book, and thus reading light 6 is capable of effectively assist the passenger in reading, by emitting light from above the head of the passenger. For this reason, reading light 6 needs not emitting excessive light, may emit an amount of light minimally necessary for reading, and is capable of achieving power saving.

Moreover, in illumination system 1 according to Embodiment 1, reading light 6 has a uniformity ratio of illuminance higher than a uniformity of illuminance of dining light 5.

According to this configuration, reading light 6 has a luminance difference smaller than dining light 5, and thus the whole region is substantially uniformly bright and the letters etc. are easily viewable. Consequently, reading light 6 is more suitable for reading than dining light 5 is.

Moreover, in illumination system 1 according to Embodiment 1, an illuminance distribution of light emitted to table 4 by dining light 5 includes: central irradiated area P1 having an optical axis of dining light 5; and peripheral irradiated area P2 which surrounds central irradiated area P1 and has an illuminance lower than an illuminance of central irradiated area P1. A degree to which an illuminance decreases with distance from the optical axis is greater in central irradiated area P1 than in peripheral irradiated area P2.

According to this configuration, dining light 5 has an illuminance gradient greater than an illuminance gradient of reading light 6, and thus is of capable of giving a spatial effect (vividness) to food. In consequence, it is possible to further bring out the tastiness of food.

Moreover, in illumination system 1 according to Embodiment 1, a color temperature of the light in central irradiated area P1 is higher than a color temperature of the light in periphery irradiated area P2.

According to this configuration, dining light 5 makes food appear brighter and highlighted. In consequence, it is possible to further bring out the tastiness of food.

Moreover, in illumination system 1 according to Embodiment 1, dining light 5 has a Feeling of Contrast Index (FCI) higher than an FCI of reading light 6, the FCI indicating a degree of conspicuousness and vividness in color rendering.

According to this configuration, food appears more vivid in color, and thus looks more delicious.

Moreover, in illumination system 1 according to Embodiment 1, dining light 5 emits light having a color temperature of at least 2700 K and less than 5000 K. Reading light 6 emits light having a color temperature of at least 5000 K and at most 7200 K.

According to this configuration, food is made more vivid in color by causing the color temperature of dining light 5 to be lower than that of reading light 6, which makes it possible to make the food look more delicious. As a result, the passenger has a big appetite. Furthermore, reading light 6 is allowed to emphasize the whiteness of paper (enhance contrast feeling) at the time of reading, by causing the color temperature of reading light 6 to be higher than that of dining light 5. For this reason, letters, pictures, or the like are easily viewable at the time of reading.

Moreover, illumination system 1 according to Embodiment 1 further includes a wall partly surrounding seat 2. The wall includes side wall 33 on a lateral side of seat 2. Dining light 5 is provided on side wall 33 such that an optical axis of dining light 5 crosses table 4.

According to this configuration, light is emitted to table 4 such that the optical axis of dining light 5 crosses table 4, and thus a shadow is not easily cast on food on table 4. In consequence, the passenger is not easily caused to feel a sense of discomfort.

Moreover, in illumination system 1 according to Embodiment 1, side wall 33 provided is on the left side of the passenger when the passenger is seated on seat 2. Dining light 5 is provided on side wall 33.

According to this configuration, right-handed people account for approximately 90% of the world population, and thus when a right-handed person dines, a shadow is not easily cast by an arm or the like of the right-handed person. In consequence, the passenger is not easily caused to feel a sense of discomfort.

Moreover, illumination system 1 according to Embodiment 1 further includes controller 8 which causes dining light 5 to emit light having a color temperature suitable for food.

According to this configuration, light having a high color temperature which enhances white color is suitable for, for example, Japanese food as a meal menu. For this reason, a contrast between the color of a serving dish and the color of food is made clear by causing a color temperature to be suitable for food, and it is possible to add a sense of high quality or a refreshing effect. As a result, it is possible to make food look more delicious.

Moreover, in illumination system 1 according to Embodiment 1, an illuminance of reading light 6 measured at distance D from reading light 6 is greater than an illuminance of dining light 5 measured at distance D from dining light 5, where distance D is equal to a distance from dining light 5 to table 4.

Moreover, in illumination system 1 according to Embodiment 1, the uniformity ratio of illuminance is a ratio of a minimum illuminance on an irradiated region to an average illuminance of the irradiated region.

Moreover, in illumination system 1 according to Embodiment 1, an illuminance in central irradiated area P1 more rapidly decreases with an increase of a distance from the optical axis than in peripheral irradiated area P2.

Moreover, in illumination system 1 according to Embodiment 1, the side wall is provided on the right side of the passenger when the passenger is seated on seat 2. Dining light 5 is provided on the side wall.

Embodiment 2

Hereinafter, illumination system 200 according to Embodiment 2 will be described with reference to FIG. 9 and FIG. 10.

Figure 9:
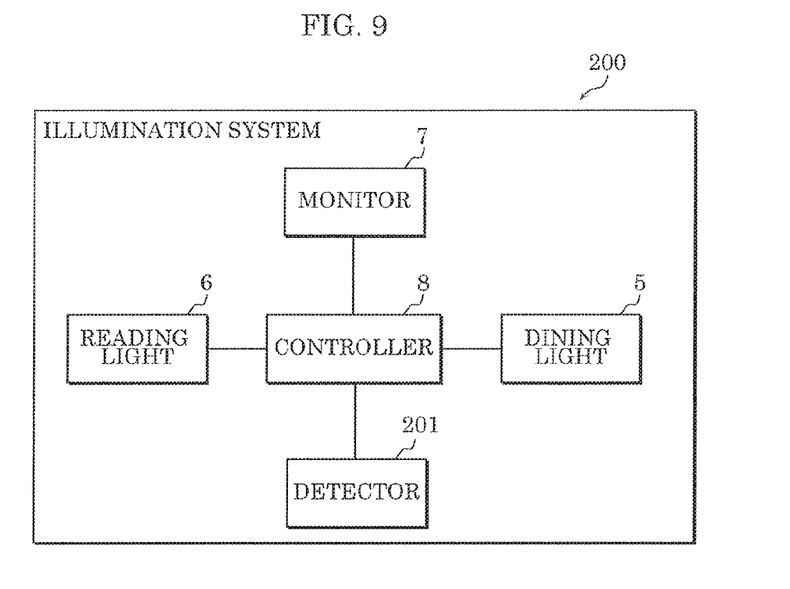
FIG. 9 is a block diagram illustrating an illumination system according to Embodiment 2.
Figure 10:
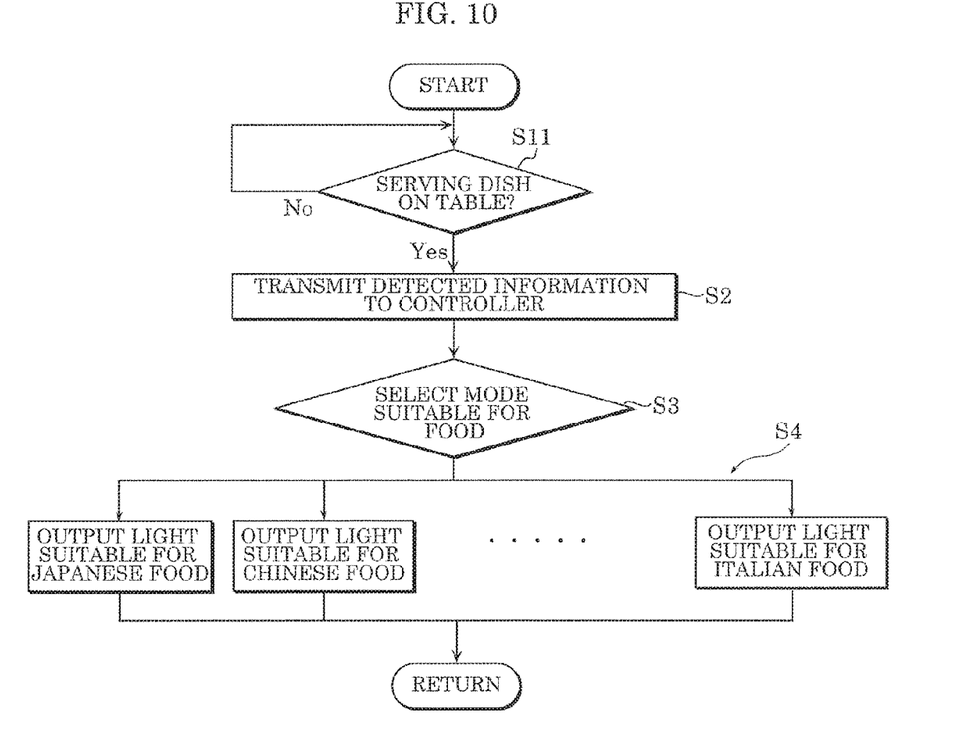
FIG. 10 is a flow chart illustrating operations performed by the illumination system according to Embodiment 2.

FIG. 9 is a block diagram illustrating illumination system 200 according to Embodiment 2. FIG. 10 is a flow chart illustrating operations performed by illumination system 200 according to Embodiment 2.

Embodiment 2 differs from Embodiment 1 in that illumination system 200 includes detector 201.

The other structural elements in Embodiment 2 are the same as those in Embodiment 1. The same structural elements are assigned the same reference signs, and detailed description thereof is omitted.

Dining light 5 is capable of emitting, to food placed on table 4, light having a color temperature suitable for the food. Light having a color temperature suitable for a food is light in a lighting mode suitable for a food such as Japanese food, Chinese food, and Italian food. It is to be noted that light having a color temperature suitable for a food is not limited to the above, and may be light suitable for a scene such as breakfast, lunch, and dinner.

Detector 201 is a sensor capable of recognizing a serving dish placed on table 4 and a color, a shape, etc. of the serving dish, and includes, for example, a camera. Detector 201 detects information (information about the serving dish) and transmits the detected information to controller 8. Detector 201 may be provided in any manner as long as detector 201 is capable of recognizing a serving dish placed on table 4. It is to be noted that alternatively any publicly known technique may be used as long as the technique makes it possible to recognize a serving dish.

Controller 8 receives the information detected by detector 201, and recognizes a food based on the information about the serving dish detected by detector 201. Specifically, the detected information indicates a pre-association between a color of a serving dish and a food, such as a black serving dish associated with Japanese food, a red serving dish associated with Chinese food, and a yellow serving dish associated with Italian food. Information indicating such a pre-association may be stored in a storage.

Controller 8 selects a lighting mode suitable for the food based on the received information, and causes dining light 5 to output light suitable for the food. For example, in the lighting mode for Japanese food, controller 8 causes dining light 5 to emit light having a high color temperature to heighten contrast between the color of the serving dish and the color of the food.

[Operations]

Hereinafter, operations for recognizing a food using illumination system 200 described above will be described.

First, illumination system 200 is activated by an operation by the passenger. Detector 201 determines whether a serving dish is placed on table 4, to detect a color, a shape, etc. of the serving dish (step S1). When the serving dish is not placed on table 4 (NO in step S1), the process returns to step S1. In contrast, when the serving dish is placed on table 4 (YES in step S1), detector 201 detects the color, shape, etc. of the serving dish in which a food is placed, and transmits information resulting from the detection to controller 8 (step S2).

Next, controller 8 selects a lighting mode suitable for the food based on the information received from detector 201 (step S3).

Next, controller 8 causes dining light 5 to output light suitable for Japanese food, Chinese food, Italian food, or the like (step S4). The process ends here and returns to the start.

Advantageous Effects

Next, advantageous effects of illumination system 200 and a lighting control method according to Embodiment 2 will be described.

As described above, illumination system 200 according to Embodiment 2 further includes detector 201 which detects a serving dish used for the food and placed on table 4, and transmits information resulting from the detection to controller 8. Controller 8 control dining light 5 based on the information received from detector 201 and indicating the serving dish used for the food.

According to this configuration, the light suitable for the food is automatically emitted without the passenger turning on dining light 5, and thus it is possible to reduce the burden of operation by the passenger.

Moreover, the lighting control method according to Embodiment 2 includes: acquiring information with respect to food placed on table 4; transmitting the information with respect to the food from detector 201 to a controller; and controlling an illumination mode of each of dining light 5 and reading light 6, based on the information.

Moreover, in the lighting control method according to Embodiment 2, dining light 5 and reading light 6 are provided in mobile body 100.

Moreover, illumination system 200 according to Embodiment 2 produces the same advantageous effects as illumination system 1 according to Embodiment 1.

(Other Variations Etc.)

Although the illumination systems according to the present disclosure have been described based on the aforementioned embodiments, the present disclosure is not limited to the aforementioned embodiments.

For example, the seat may include a footrest in the aforementioned embodiments. The upper end portion of the backrest may vertically slide along the wall behind the seat. The lower end portion of the backrest may slide forward along with a downward slide of the upper end portion. In addition, the seat and the footrest may slide forward along with the slide of the lower end portion. The footrest may be pivotable about an end portion of the footrest closer to the seating portion, and may be substantially vertical when the passenger is in the seated posture, and may be substantially horizontal when the passenger is in the lying posture. In this case, when the passenger takes the lying posture, the backrest, the seating portion, and the footrest align substantially horizontally, which allows the passenger to take the lying posture easily.

Moreover, in the aforementioned embodiments, when a food is brought to the passenger while, for example, the passenger is using a computer on the table, an operation may be performed via the input unit such that the dining light is not automatically turned on.

For example, each of the structural elements in the aforementioned embodiments may be configured in the form of a specialized hardware product, or may be realized by executing a software program suitable for the structural element. Each of the structural elements may be realized by a program executing unit, such as a CPU or a processor, reading and executing a software program recorded on a recording medium such as a hard disk or a semiconductor memory.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination system, comprising:
   a seat in a mobile body;
   a table to be positioned in front of a passenger when the passenger is seated on the seat;
   a first light source which illuminates the table; and
   a second light source which illuminates a region closer to the passenger than to the table,
   wherein when a distance from the first light source to the table is equal to a distance from the second light source to a virtual irradiated surface, an illuminance on the table irradiated by the first light source is lower than an illuminance on the virtual irradiated surface irradiated by the second light source.

2. The illumination system according to claim 1,
   wherein the second light source has a uniformity ratio of illuminance higher than a uniformity ratio of illuminance of the first light source.

3. The illumination system according to claim 2,
   wherein the uniformity ratio of illuminance is a ratio of a minimum illuminance on an irradiated region to an average illuminance of the irradiated region.

4. The illumination system according to claim 1,
   wherein an illuminance distribution of light emitted to the table by the first light source includes: a central irradiated area of which center corresponds to an optical axis of the first light source; and a peripheral irradiated area which surrounds the central irradiated area and has an illuminance lower than an illuminance of the central irradiated area, and
   a degree to which an illuminance decreases with distance from the optical axis is greater in the central irradiated area than in the peripheral irradiated area.

5. The illumination system according to claim 4,
   wherein a color temperature of the light in the central irradiated area is higher than a color temperature of the light in the peripheral irradiated area.

6. The illumination system according to claim 1,
   wherein the first light source has a Feeling of Contrast Index (FCI) higher than an FCI of the second light source, the FCI indicating a degree of conspicuousness and vividness in color rendering.

7. The illumination system according to claim 1,
   wherein the first light source emits light having a color temperature of at least 2700 K and less than 5000 K, and
   the second light source emits light having a color temperature of at least 5000 K and at most 7200 K.

8. The illumination system according to claim 1, further comprising
   a wall partly surrounding the seat,
   wherein the wall includes a side wall on a lateral side of the seat, and
   the first light source is provided on the side wall such that an optical axis of the first light source crosses the table.

9. The illumination system according to claim 8,
   wherein the side wall is provided on the left side of the passenger when the passenger is seated on the seat, and
   the first light source is provided on the side wall.

10. The illumination system according to claim 8,
    wherein the side wall is provided on the right side of the passenger when the passenger is seated on the seat, and
    the first light source is provided on the side wall.

11. The illumination system according to claim 1,
    wherein the first light source is a dining light which is turned on when the passenger dines, and
    the second light source is a reading light which is turned on when the passenger reads.

12. The illumination system according to claim 11,
    wherein the reading light is provided in a region closer to the seat than the dining light is.

13. The illumination system according to claim 1, further comprising
    a controller which causes the first light source to emit light having a color temperature suitable for food placed on the table.

14. The illumination system according to claim 13, further comprising
    a detector which detects a serving dish used for the food and placed on the table, and transmits information resulting from the detection to the controller,
    wherein the controller controls the first light source based on the information received from the detector and indicating the serving dish used for the food.

15. A mobile body comprising the illumination system according to claim 1.

16. The mobile body according to claim 15,
    wherein the mobile body is an airplane.

17. A lighting control method comprising:
    acquiring information with respect to food placed on a table;
    transmitting the information with respect to the food from a detector to a controller; and
    controlling an illumination mode of a light source that illuminates the food, based on the information,
    wherein:
    the light source includes a first light source and a second light source,
    the second light source illuminates a region closer to a passenger than to the table, and
    when a distance from the first light source to the table is equal to a distance from the second light source to a virtual irradiated surface, an illuminance on the table irradiated by the first light source is lower than an illuminance on the virtual irradiated surface irradiated by the second light source.

18. The lighting control method according to the claim 17,
    wherein the light source is provided in a mobile body.

* * * * *